United States Patent [19]

Sano et al.

[11] Patent Number: 5,299,649
[45] Date of Patent: Apr. 5, 1994

[54] STEERING DEVICE AND SPEED REDUCTION DEVICE

[75] Inventors: Osamu Sano, Kashihara; Toshihiko Daido, Temmadainishi, both of Japan

[73] Assignee: Koyo Seiko Co., Ltd., Osaka, Japan

[21] Appl. No.: 917,717

[22] Filed: Jul. 24, 1992

[30] Foreign Application Priority Data

Jul. 24, 1991 [JP] Japan .................. 3-184654
Nov. 14, 1991 [JP] Japan .................. 3-298908
May 21, 1992 [JP] Japan .................. 4-129064

[51] Int. Cl.⁵ .......................................... B62D 5/04
[52] U.S. Cl. ................................ 180/79.1; 180/79.3; 74/498
[58] Field of Search ............ 180/79.1, 79.3, 142, 180/143; 74/388 PS, 498

[56] References Cited

U.S. PATENT DOCUMENTS

| | | | |
|---|---|---|---|
| 4,415,054 | 11/1983 | Drutchas | 180/79 |
| 5,133,423 | 7/1992 | Ijiri et al. | 180/79.1 |
| 5,174,407 | 12/1992 | Shimizu et al. | 180/79.1 |

FOREIGN PATENT DOCUMENTS

| | | |
|---|---|---|
| 3910814A1 | 10/1990 | Fed. Rep. of Germany . |
| 59-50864 | 3/1984 | Japan . |
| 60-154955 | 8/1985 | Japan . |
| 60-263763 | 12/1985 | Japan . |
| 393110 | 10/1965 | Switzerland . |

*Primary Examiner*—Margaret A. Focarino
*Assistant Examiner*—C. Mattix
*Attorney, Agent, or Firm*—Mason, Fenwick & Lawrence

[57] ABSTRACT

A speed reduction device for steering devices comprises a first rotary shaft supported by a housing and rotatable by an external force, a second rotary shaft axially movably fitted to the first rotary shaft and nonrotatable relative thereto, a movable member attached to the housing axially movably but nonrotatably and fitted to the second rotary shaft axially movably and rotatably relative thereto, a first ball screw connecting the second rotary shaft to the housing, and a second ball screw connecting the movable member to the second rotary shaft.

6 Claims, 5 Drawing Sheets

STEERING DEVICE AND SPEED REDUCTION DEVICE

BACKGROUND OF THE INVENTION

The present invention relates to steering devices and speed reduction devices for use in motor vehicles and the like.

With electric motor-driven power steering devices of the rack-pinion type, the rotation of the motor needs to be transmitted to a rack shaft (movable member) upon speed reduction. With such a conventional power steering device having a d.c. motor incorporated therein, the rotation of the motor is delivered, for example, to a worm reduction gear mechanism for speed reduction and then to the rack shaft by a pinion and a rack.

Another power steering device is also proposed which comprises a housing for supporting a rack shaft, a tubular rotary shaft disposed inside the housing and rotatable by an electric motor, and a ball nut (nut having recirculating balls) disposed inside the housing and rotatably supported, the rack shaft extending through the shaft and the nut. The rotation of the rotary shaft is transmitted through a planetary gear reduction mechanism to the ball nut, the rotation of which is transmitted to the rack shaft via a ball thread mechanism (see Unexamined Japanese Patent Publication SHO 60-154955).

On the other hand, a hydraulic power steering device of the ball thread type is known which comprises a housing having a cylinder portion, a rotary shaft (output shaft) disposed in the cylinder portion and rotatable by the rotation of a steering wheel, and a piston member (movable member) disposed in the cylinder portion and partitioning the interior of this portion into front and rear oil chambers. The rotation of the rotary shaft is transmitted to the piston member through a ball thread mechanism to move the piston member forward or rearward and thereby rotate a pitman shaft.

However, in the case of the conventional motor-driven power steering devices of the rack-pinion type stated, the characteristics of the d.c. motor involve a high-speed rotation and a low torque and therefore require a great reduction ratio, which necessitates a complex reduction mechanism such as those mentioned and exerts a great adverse effect on the performance involving return of the steering wheel. Furthermore, the use of the worm or planetary gear reduction mechanism for reducing the speed of rotation of the motor entails a great transmission loss, so that the motor needs to have an increased capacity. In the case where the ball thread mechanism is used for speed reduction, the reduction ratio is dependent on the lead of thread of the mechanism, whereas it is impossible to greatly change the lead of thread of the mechanism in view of the construction. This presents difficulty in greatly altering the reduction ratio, leading to reduced freedom of design.

The hydraulic power steering device of the ball thread type similarly has the problem of reduced freedom of design since the ball thread mechanism is used for speed reduction.

The same problem as above is also encountered with steering devices other than power steering devices and with other speed reduction devices.

SUMMARY OF THE INVENTION

The main object of the present invention is to provide a steering device and speed reduction device which have a reduction mechanism which is simple, efficient and diminished in transmission loss so that the devices can be designed with greatly increased freedom.

The steering device and speed reduction device of the present invention comprise a first rotary shaft supported by a housing and rotatable by an external force, a second rotary shaft axially movably fitted to the first rotary shaft and nonrotatable relative thereto, a movable member attached to the housing axially movably but nonrotatably and fitted to the second rotary shaft axially movably and rotatably relative thereto, first thread coupling means connecting the second rotary shaft to the housing, and second thread coupling means connecting the movable member to the second rotary shaft, whereby the rotation of the first rotary shaft is transmitted to the movable member as an axial movement thereof upon speed reduction.

The external force includes both human power and a mechanical force.

Preferably, at least one of the first and second thread coupling means, more preferably each of these means, is ball thread means.

As an aspect of the invention, the second rotary shaft is tubular and is fitted in the first rotary shaft which is tubular, and the movable member is fitted in the second rotary shaft. In the case where the steering device is a speed reduction device, the first rotary shaft may be rotated by an electric motor, and the movable member may be a rack shaft. The rotor of the motor may be attached to the first rotary shaft, and the stator of the motor to the housing. The electric motor may be a brushless electric motor, and a sensor for detecting the rotated position of the motor rotor may be attached to the motor directly or indirectly via a coupling mechanism.

As another aspect of the invention, a stationary shaft is fixed to the housing coaxially with the first rotary shaft, and the second rotary shaft is tubular and is fitted around the first rotary shaft and the stationary shaft, the first thread coupling means being provided between the stationary shaft and the second rotary shaft, the movable member being fitted around the second rotary shaft. In the case where the steering device is a speed reduction device, the first rotary shaft may be an output shaft rotatable by the rotation of a steering wheel, and the movable member may be coupled to a pitman shaft. A hydraulic control valve may be provided between an input shaft connected to the steering wheel and the first rotary shaft connected to the input shaft by a torsion bar, the movable member having a piston portion slidable in a cylinder portion formed in the housing, oil chambers being formed in the interior of the cylinder portion on opposite sides of the piston portion and communicating with the control valve.

The rotation of the first rotary shaft is transmitted to the second rotary shaft, rotating the second rotary shaft with the first rotary shaft and causing the first thread coupling means to axially move the second rotary shaft at the same time. The rotation and axial movement of the second rotary shaft are converted by the second thread coupling means to an axial movement of the movable member. Consequently, the rotation of the first rotary shaft is transmitted to the movable member upon speed reduction. Since the rotational speed of the first rotary shaft is reduced by the thread coupling means, the transmission loss involved is small. Furthermore, the amount of movement of the movable member per unit amount of rotation of the first and second rotary shafts, i.e., the reduction ratio (transmission ratio), can be optionally determined in accordance with the direction (hand) of threads of the two thread coupling means and the lead of threads thereof.

Thus, the steering device and the speed reduction device of the present invention are diminished in the overall transmission loss and permit use of a motor of reduced capacity. Furthermore, the reduction ratio can be determined as desired in accordance with the hand and lead of the threads of the two thread coupling means. The devices can therefore be designed with greatly increased freedom.

Use of ball thread means as at least one of the first and second thread coupling means results in a greatly reduced transmission loss. However, other thread coupling means such as slide screws are alternatively usable.

When the electric motor has a rotor attached to the first rotary shaft and a stator attached to the housing so as to rotate the first rotary shaft directly by the motor, the transmission loss occurs only at the locations of the first and second thread coupling means. Since the transmission through the thread coupling means involves only a small loss, the overall transmission loss is very small. However, even if the rotation of the motor is transmitted to the first rotary shaft upon speed reduction by one reduction gear mechanism, the portion where a transmission loss occurs is almost limited only to this mechanism, with the result that the overall transmission loss is small.

Because the brushless motor rotates at a low speed with a high torque, the reduction ratio required can be lower, permitting use of a simple reduction mechanism. The low-speed rotation and high-torque motor characteristics can be fully utilized by using the brushless motor in combination with a reduction mechanism including ball thread means or like thread coupling means, and the reduced motor inertia achieves great improvements in the return of steering wheel and like performance. Nevertheless, an electric motor other than the brushless motor can of course be used.

DESCRIPTION OF THE PREFERRED EMBODIMENTS

Embodiments of the invention will be described below with reference to the drawings.

Figure 1:
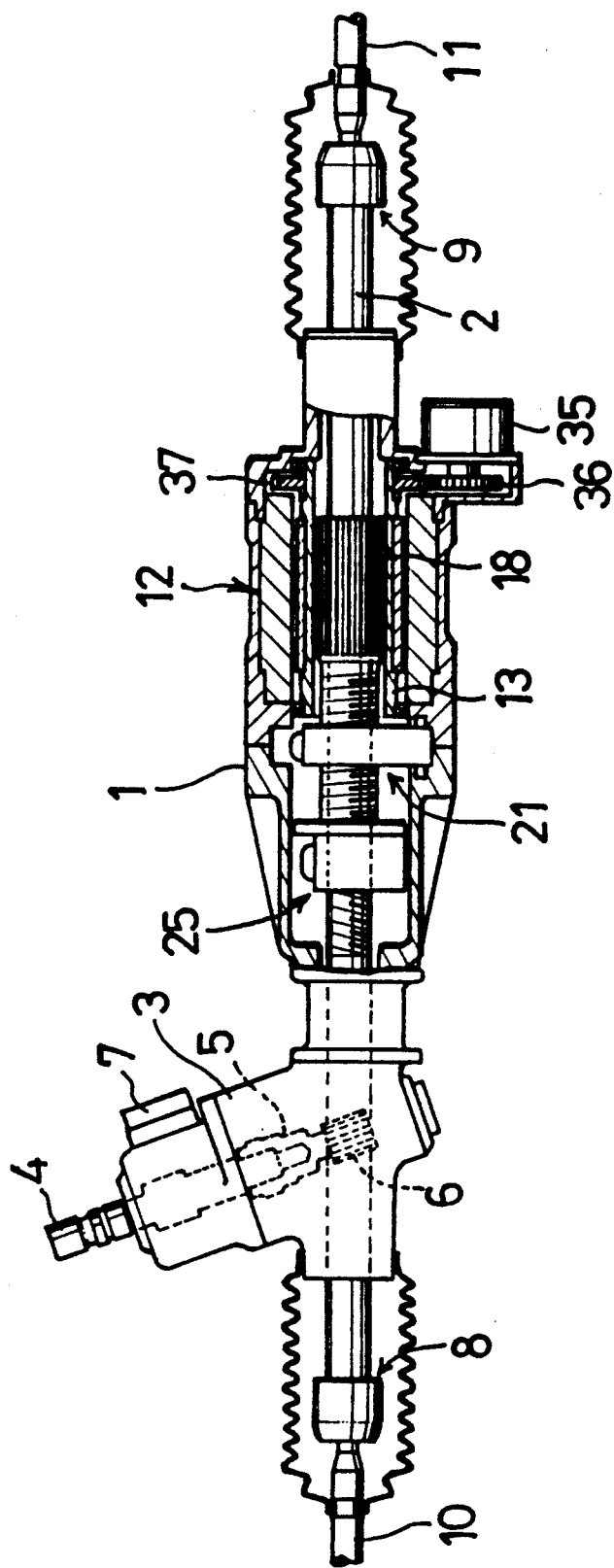
FIG. 1 is a rear view partly broken away and showing an electric motor-driven power steering device of the rack-pinion type embodying the invention.
Figure 2:
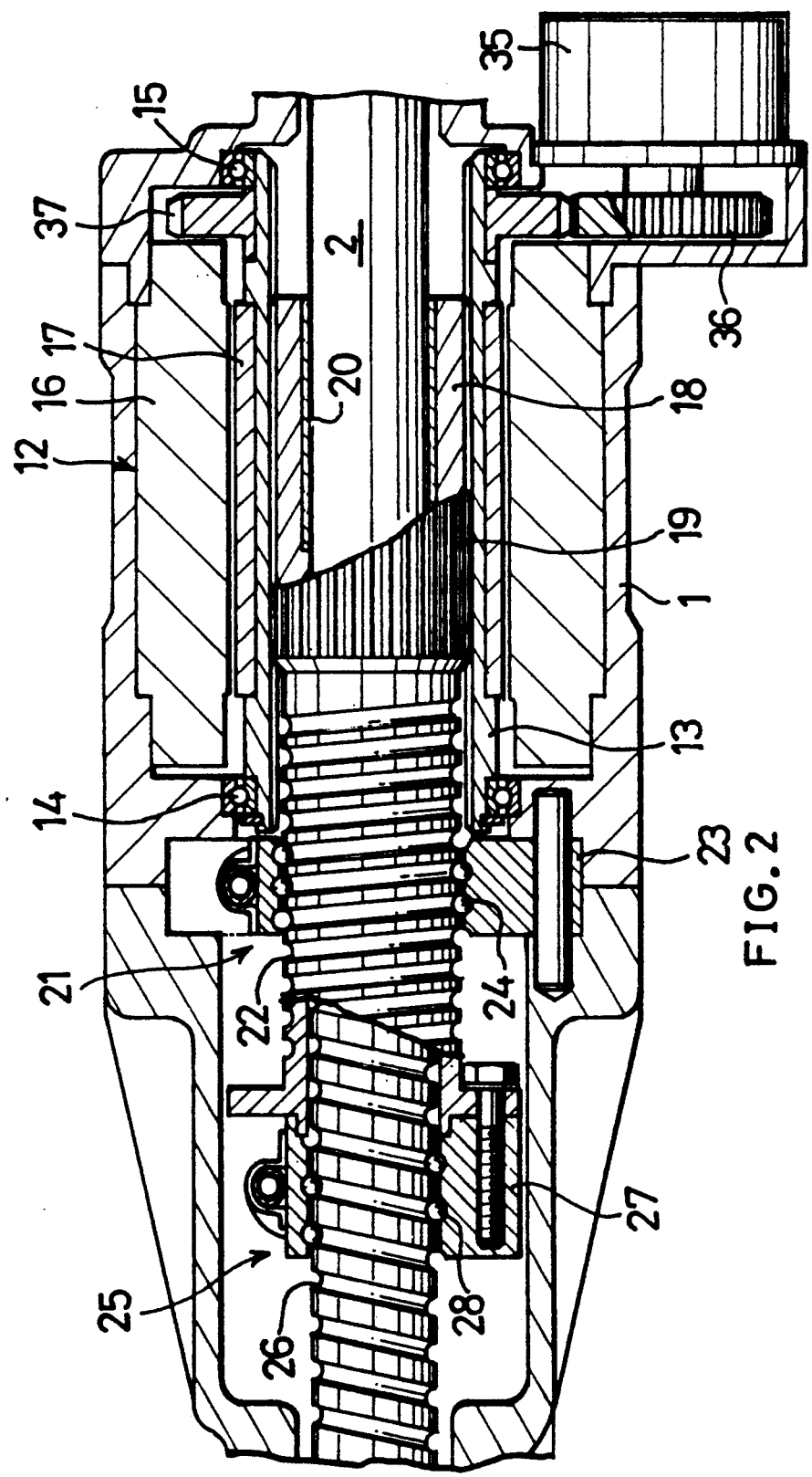
FIG. 2 is an enlarged rear view partly broken away and showing a speed reduction device included in the power steering device of FIG. 1.

FIGS. 1 and 2 show a first embodiment which is an electric motor-driven power steering device of the rack-pinion type for the front wheels of motor vehicles. FIG. 1 shows the main portion of the steering device, and FIG. 2 shows a speed reduction device of the steering device in detail. In the following description of the first embodiment, the right-hand side and the left-hand side of these drawings will be referred to as "right" and "left," respectively.

A housing 1 elongated in the right-left direction is fixed to the frame of the motor vehicle. A rack shaft (movable member) 2 extending in the right-left direction is supported by the housing 1 inside thereof movably in the same direction (axial direction) although not rotatable relative thereto. The housing 1 is formed toward the left end thereof with a gear box 3 having an input shaft 4 and an output shaft 5 which are rotatably supported and interconnected by a torsion bar (not shown). The output shaft 5 is integral with a pinion 6 meshing with a rack (not shown) on the rack shaft 2. The input shaft 4 is connected to an unillustrated steering wheel. The gear box 3 is provided with a torque sensor 7 for detecting the steering torque of the steering wheel by detecting the torsion of the torsion bar between the input shaft 4 and the output shaft 5. The right and left ends of the rack shaft 2 projecting from the housing 1 have tie rods 10, 11 connected thereto by ball joints 8, 9, respectively.

Disposed within an intermediate portion of the housing 1 is a tubular outer rotary shaft (first rotary shaft) 13 rotatable by a brushless electric motor 12 and supported by bearings 14, 15 so as not to move axially. The motor 12 comprises a stator 16 fixedly provided inside the housing 1 and a rotor 17 mounted directly on the outer periphery of the outer rotary shaft 13.

A position sensor 35 comprising a rotary encoder is mounted on a suitable portion of the housing 1 around the rack shaft 2. A gear 36 fixed to the input shaft of the sensor 35 is in mesh with a gear 37 fixedly provided around the right end of the outer rotary shaft 13. The rotation of the outer rotary shaft 13 is transmitted to the sensor 35 upon speed reduction by the gears 37, 36 for the sensor 35 to detect the position of the outer rotary shaft 13, i.e., of the rotor 17, as rotated.

A tubular inner rotary shaft (second rotary shaft) 18 is disposed inside of and attached to the outer rotary shaft 13 so as to be movable axially but not rotatably relative thereto as by splining as indicated at 19. The rack shaft 2 extends through the inner rotary shaft 18 with a bush 20 interposed there-between and is rotatable and axially movable relative to the shaft 18.

The inner rotary shaft 18 is always positioned as partially projected leftward beyond the outer rotary shaft 13 even when moved relative to the outer rotary shaft 13. The projected portion is connected to the housing 1 by first ball thread means 21 constituting first thread coupling means. More specifically, the inner rotary shaft 18 is externally threaded as at 22, and this threaded portion 22 is screwed in a ball nut 23 secured to the housing 1, with a multiplicity of recirculating balls 24 provided between the portion 22 and the nut 23.

The rack shaft 2 is connected to the left end of the inner rotary shaft 18 by second ball thread means 25 constituting second thread coupling means in the following manner. More specifically, the rack shaft 2 is externally threaded as at 26, and this threaded portion 26 is screwed in a ball nut 27 fixed to the left end of the inner rotary shaft 18, with a multiplicity of recirculating balls 28 provided between the portion 26 and the nut 27.

Figure 2A:
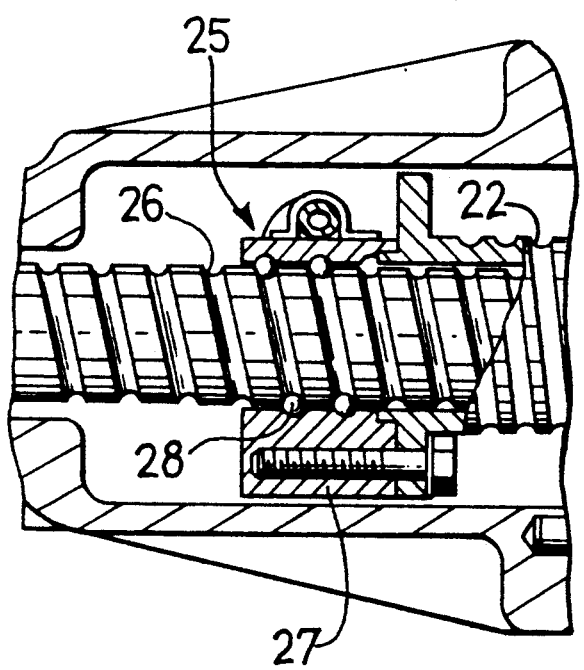
FIG. 2a illustrates an alternative variation of the embodiments of FIGS. 2 and 3.

According to the present embodiment, the first ball thread means 21 has a right-handed thread, and the second ball thread means 25 has a left-handed thread. Thus, the threads of the two ball thread means 21, 25 are opposite to each other in hand. The lead of thread of the second ball thread means 25 is greater than that of the first ball thread means 21. However, the invention is not restricted to the use of ball thread means 21 and that are of opposite hand (thread orientation) and the ball thread means 21 and 25 can both have either right hand threads or left hand threads if desired. FIG. 2a illustrates such an arrangement in which the ball thread means 21 and 25 are both of the same orientation.

When the driver rotates the steering wheel, the rotation is transmitted to the pinion 6 through the input shaft 4, torsion bar and output shaft 5. The rotation of the pinion 6 moves the rack shaft 2 rightward or leftward to steer the wheels coupled thereto. At this time, the motor 12 is driven in accordance with the direction and magnitude of the steering torque detected by the torque sensor 7, whereby the rack shaft 2 is moved in the same direction as the movement thereof effected by the pinion 5.

For example when the rack shaft 2 is moved leftward by manipulating the steering wheel, the rotor 17 of the motor 12 is rotated rightward (clockwise) when seen from the right. This rotates the outer rotary shaft 13 and the inner rotary shaft 18 in the same direction by the same amount. The clockwise rotation of the inner rotary shaft 18 causes the first ball thread means 21 to move the shaft 18 leftward relative to the housing 1, also causing the second ball thread means 25 to move the rack shaft 2 leftward relative to the inner rotary shaft 18. As a result, the rack shaft 2 moves leftward relative to the housing 1. The amount of this movement is equal to the amount of movement of the inner rotary shaft 18 relative to the housing 1 plus the amount of movement of the rack shaft 2 relative to the inner rotary shaft 18. The amount of movement of the inner rotary shaft 18 relative to the housing 1 is in proportion to the amount of rotation of the shaft 18 and to the lead of thread of the first ball thread means 21. The amount of movement of the rack shaft 2 relative to the inner rotary shaft 18 is in proportion to the amount of rotation of the shaft 18 and to the lead of thread of the second ball thread means 25. Accordingly, the amount of movement of the rack shaft 2 relative to the housing 1 is in proportion to the sum of leads of threads of the two ball thread means 21, 25 and to the amount of rotation of the inner rotary shaft 18.

When the rack shaft 2 is moved rightward by manipulating the steering wheel, the rack shaft 2 moves rightward by an amount which is similarly in proportion to the sum of leads of threads of the two ball thread means 21, 25.

If the threads of the two ball thread means 21, 25 are the same in hand, the direction of movement of the inner rotary shaft 18 relative to the housing 1 is opposite to the direction of movement of the rack shaft 2 relative to the inner rotary shaft 18. Consequently, the direction of movement of the rack shaft 2 relative to the housing 1 is dependent on the direction of rotation of the inner rotary shaft 18 and on the relation between the leads of threads of the two ball thread means 21, 25, and the amount of movement of the rack shaft 2 is in proportion to the difference between the leads of these threads and to the amount of rotation of the inner rotary shaft 18.

For example in the case where the two ball thread means 21, 25 are right-handed, the outer and inner rotary shafts 13, 18, when rotated rightward as seen from the right side, cause the first ball thread means 21 to move the inner rotary shaft 18 leftward relative to the outer rotary shaft 13, also causing the second ball thread means 25 to move the rack shaft 2 rightward relative to the inner rotary shaft 18. If the lead of thread of the first ball thread means 21 is then greater than that of the second ball thread means 25, the rack shaft 2 moves leftward by an amount in proportion to the difference between the leads of threads of these ball thread means 21, 25. If the outer rotary shaft 13, as seen from the right side, is rotated leftward, the rack shaft 2 moves rightward similarly by an amount in proportion to the difference.

In the case where the two ball thread means 21, 25 are left-handed, the outer and inner rotary shafts 13, 18, if rotated rightward when seen from the right side, cause the first ball thread means 21 to move the inner rotary shaft 18 rightward relative to the outer rotary shaft 13, also causing the second ball thread means 25 to move the rack shaft 2 leftward relative to the inner rotary shaft 18. If the lead of thread of the first ball thread means 21 is then smaller than that of the second ball thread means 25, the rack shaft 2 moves leftward by an amount in proportion to the difference between the leads of threads of these ball thread means 21, 25. When the outer rotary shaft 13 as seen from the right side is rotated leftward, the rack shaft 2 moves rightward similarly by an amount in proportion to the difference.

Thus, the amount of movement of the rack shaft 2 relative to the housing 1 per unit amount of rotation of the inner rotary shaft 18 effected by the motor 12, i.e., the reduction ratio, is dependent on the leads of threads of the two ball thread means 21, 25, so that the reduction ratio can be determined as desired by determining the leads suitably.

The rotation of the inner rotary shaft 18 effected by the motor 12 is transmitted to the rack shaft 2 by the ball thread means 21, 25 which are very small in transmission loss. This ensures a greatly reduced overall transmission loss and therefore makes it possible to use a motor 12 of reduced capacity.

For example in the case where the rotation of the motor is transmitted to the rack shaft through a worm and rack-pinion assembly as in the prior art, the overall transmission efficiency is about 0.6, whereas when the rotation of the motor is transmitted to the rack shaft via the two ball thread means as in the present embodiment, the overall transmission efficiency is about 0.9. The present embodiment therefore provides the same drive force as afforded by the conventional arrangement with use of a motor having about ⅔ of the capacity of the motor conventionally used.

The brushless motor 12 rotates at a low speed with a high torque, so that the reduction ratio can be lower, permitting use of a simple reduction mechanism. The low-speed rotation high-torque motor characteristics can be fully utilized by the combination of brushless motor 12 and reduction mechanism including the two ball thread means 21, 25. The reduced inertia of the motor leads to improvements in performance including return of the steering wheel. Although the brushless motor 12 used requires the position sensor 35, this sensor 35 can be provided at a portion around the rack shaft 2 with great freedom.

Figure 3:
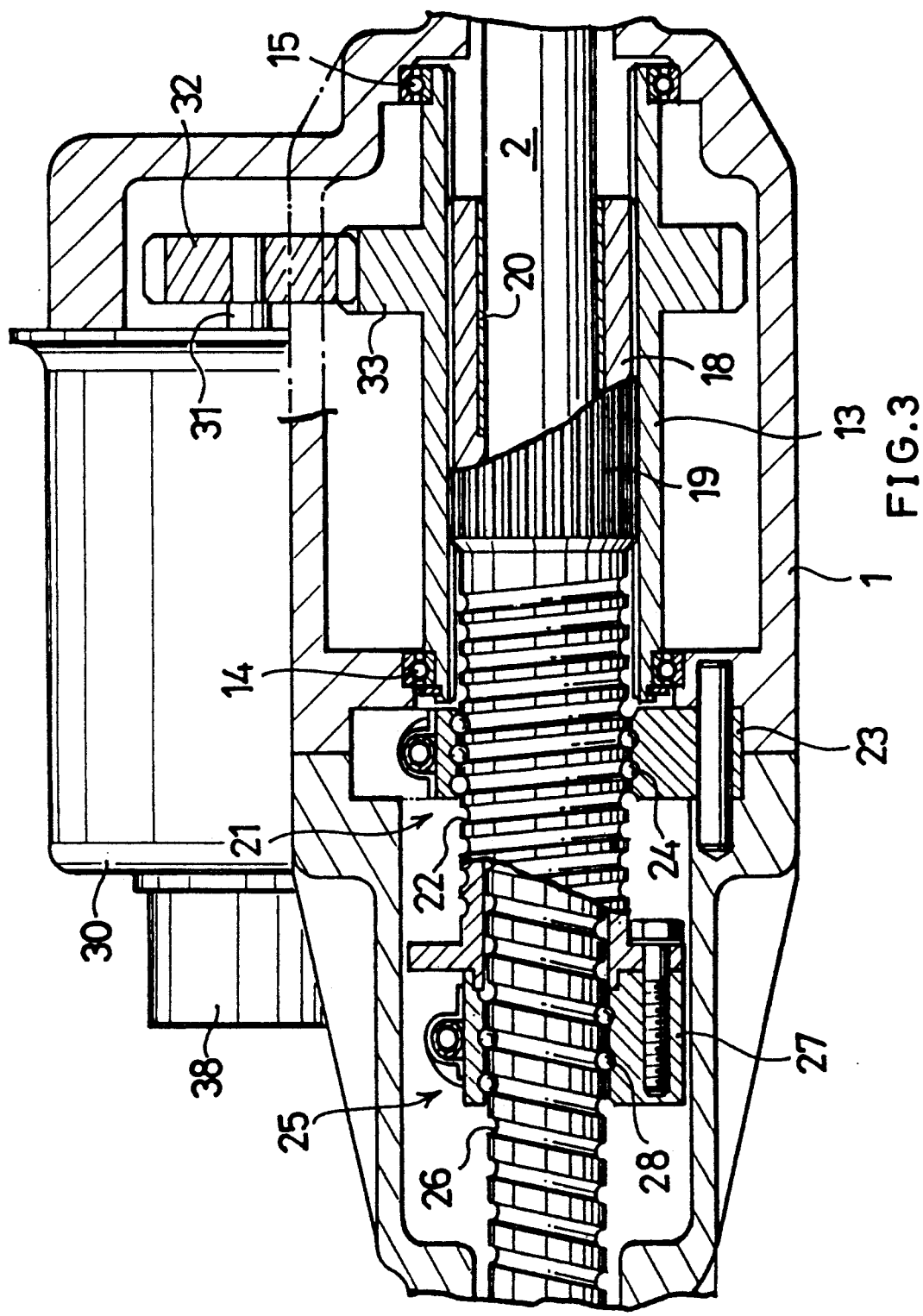
FIG. 3 is a rear view partly broken away and showing the main components of another electric motor-driven power steering device of the rack-pinion type embodying the invention.

FIG. 3 shows a second embodiment which is also an electric motor-driven power steering device of the rack-pinion type for front wheels. FIG. 3 corresponds to FIG. 2 showing the first embodiment. Throughout these drawings, like parts are designated by like reference numerals.

In the case of the second embodiment, a brushless electric motor 30 is provided on the outer side of the housing 1 and is coupled to the outer rotary shaft 13 by gears 32, 33. A sensor 38 comprising a rotary encoder or the like is attached to one end of the motor 30 for detecting the rotated position of the shaft 31 of the motor, i.e., the rotor thereof. With the exception of the above feature, the second embodiment has the same construction as the first.

Even when the rotation of the motor 30 is transmitted to the outer rotary shaft 13 upon speed reduction by one gear reduction mechanism as in the second embodiment, the overall transmission loss is small because the transmission through the two ball thread means 21, 25 involves only a very small loss as previously stated and further because the occurrence of transmission loss is almost limited only to the gear reduction mechanism.

The ball thread means 21 and 25 of the embodiment of FIG. 3 can also be of the same orientation, if desired, as shown in FIG. 2a.

Figure 4:
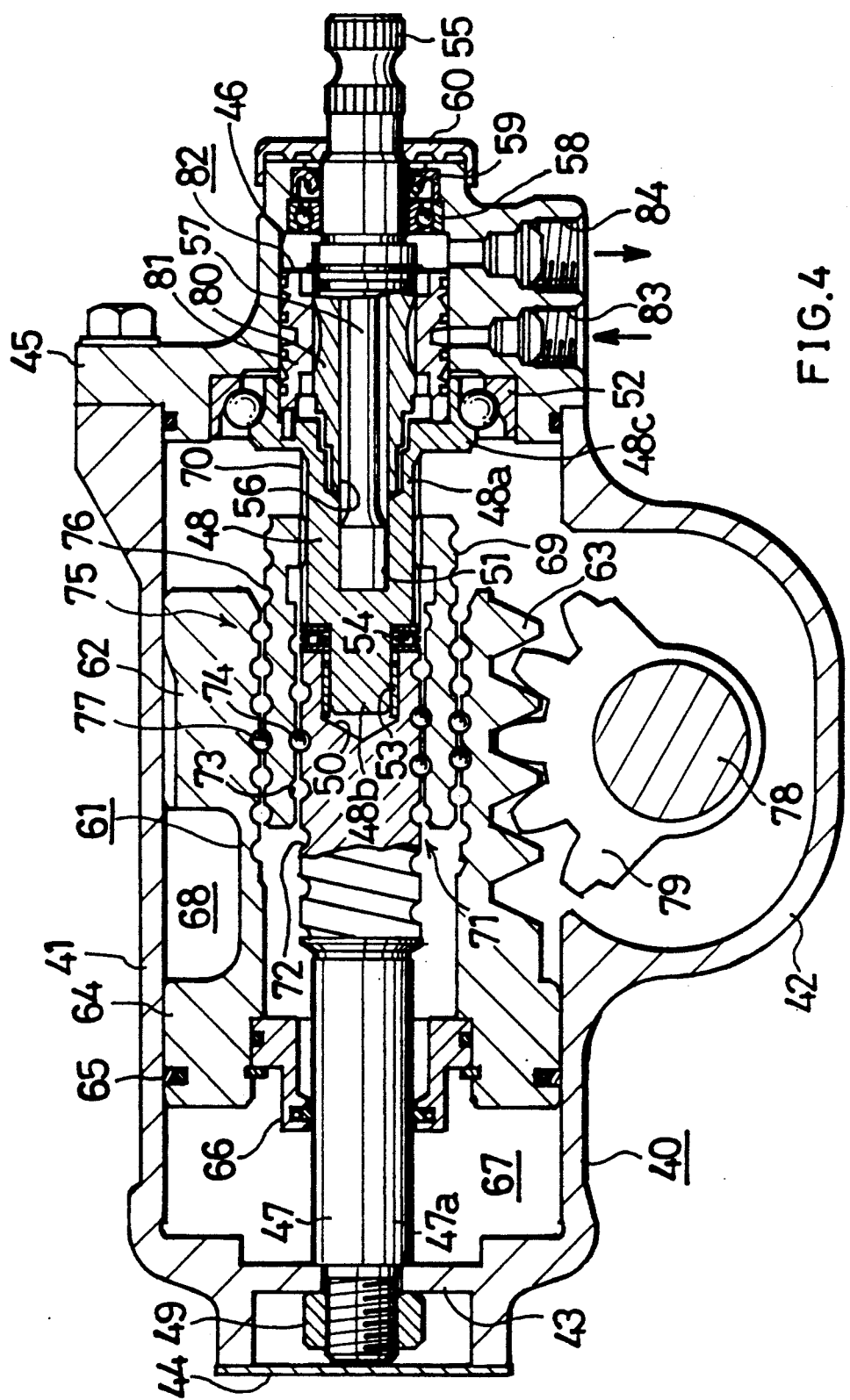
FIG. 4 is a rear view partly broken away and showing the main components of an electric motor-driven power steering device of the ball thread type embodying the invention.

FIG. 4 shows a third embodiment which is a hydraulic power steering device of the ball thread type for the front wheels of motor vehicles. The main components of the steering device is shown in FIG. 4. In the following description of the third embodiment, the left-hand side of FIG. 4 will be referred to as "front," the right-hand side thereof as "rear," the front side of the plane of the drawing as "left" and the rear side thereof as "right."

The power steering device includes a housing 40 the upper portion of which provides a cylinder portion 41 extending in the front-to-rear direction. The rear lower portion of the cylinder portion 41 is integral with a pitman shaft supporting tubular portion 42 extending in the left-to-right direction. The housing 40 is formed, close to its front end, with an end wall 43. The portion of the housing rearward from this wall is the cylinder portion 41. An opening of the housing 40 at its front end to the front of the cylinder portion 41 is closed with a front closure 44. The housing has an open rear end, to which a shaft support member 45 is attached. The front side of this member provides the cylinder portion 41. The support member 45 has a bore 46 extending therethrough in the front-to-rear direction coaxially with the cylinder portion 41. Although not shown, a side closure is provided to close an opening in the left end of the tubular portion 42 including a left lower part of the housing cylinder portion 41.

Arranged at the center of the cylinder portion 41 coaxially therewith are a stationary shaft 47 and an output shaft (first rotary shaft) 48 both extending in the front-to-rear direction. The stationary shaft 47 has a front end extending through the end wall 43 and secured thereto with a nut 49. The stationary shaft 47 extends to a rear part of the cylinder portion 41 inside thereof and has a cavity 50 formed in its rear end face. The output shaft 48 has an intermediate portion 48a, a small-diameter front end portion 48b having a smaller outside diameter than the intermediate portion 48a, and a large-diameter rear end portion 48c having a larger outside diameter than the intermediate portion 48a. The output shaft 48 is centrally formed with a stepped bore 51 extending from the rear end of its large-diameter portion 48c to a front part of its intermediate portion 48a and decreasing in inside diameter as its extends forward. The large-diameter portion 48c of the output shaft 48 is rotatably supported by a bearing 52 fixed in the front end of the bore 46 of the support member 45. The small-diameter portion 48b of the output shaft 48 is rotatably fitted in the cavity 50 of the stationary shaft 47 with a bush 53 interposed therebetween. A thrust bearing 54 is provided between annular end faces of the stationary shaft 47 and the output shaft intermediate portion 48a which faces are opposed to each other. An input shaft 55 extends in the front-to-rear direction through the bore 46 of the support member 45 centrally thereof so as to be coaxial with the output shaft 48 and to be positioned in a front part of the cavity 51 of the output shaft 48. The input shaft 55 has a bore 56 extending from its front end face to a rear portion thereof. A torsion bar 57 is inserted in the bore 51 of the output shaft 48 and the bore 56 of the input shaft 55 and has its front and rear ends fixed in the front end of the bore 51 and the rear end of the bore 56 to interconnect the two shafts 48, 55 in alignment. The input shaft 55 has a rear portion rotatably supported by a bearing 58 which is fixed in a rear portion of the bore 46 in the support member 45. A seal member 59 for sealing a clearance around the input shaft 55 in the bore 46 of the support member 45 is fixed in the rear end of the bore 46. The rear end opening of the support member 45 is closed with a rear closure 60. The input shaft 55 extends rearward through the closure 60 and is connected to an unillustrated steering wheel.

A piston member (movable member) 61 is disposed within the cylinder portion 41 of the housing 40 forwardly and rearwardly movably but nonrotatably. The piston member 61 is hollow, and the stationary shaft 47 and the output shaft 48 extend through the piston member 61 in the front-to-rear direction. The piston member 61 has a rear portion providing a ball nut portion 62, which is formed with a rack 63 on its bottom side. The piston member 61 has a front portion providing a piston portion 64, which has a piston ring 65 attached to its outer periphery. The piston member 61 has an inside diameter larger than the outside diameters of the stationary shaft 47 and the output shaft 48. A seal member 66 is attached to the inner periphery of the front portion of the piston member 61 for sealing a clearance around a solid cylindrical front portion 47a of the stationary shaft 47. The piston portion 64 and the seal member 66 partition the interior of the cylinder portion 41 into a front oil chamber 67 and a rear oil chamber 68. An intermediate rotary shaft (second rotary shaft) 69 in the form of a hollow cylinder is disposed in an annular space between the piston member 61 and the stationary shaft 47 and the output shaft 48. The intermediate shaft 69 has a rear portion attached to the outer periphery of the output shaft 48 as by splining 70 so as to be axially movable but not to rotate relative thereto. The intermediate shaft 69 is rotatable and axially movable relative to the stationary shaft 47 and the piston member 61.

The intermediate rotary shaft 69 is connected to the stationary shaft 47 by first ball thread means 71 constituting first thread coupling means. More specifically, the stationary shaft 47 has an externally threaded rear portion 72, which is screwed in an internally threaded portion 73 of the intermediate rotary shaft 69 with a multiplicity of recirculating balls 74 provided therebetween.

The nut portion 62 of the piston member 61 is connected to the intermediate rotary shaft 69 by second ball thread means 75 constituting second thread coupling means. More specifically, the intermediate rotary shaft 69 is externally threaded as at 76, and this threaded portion 76 is screwed in the nut portion 62 with a multiplicity of recirculating balls 77 interposed therebetween.

A pitman shaft 78 extending in the right-to-left direction is disposed within the tubular portion 42 of the housing 40 and rotatably supported by unillustrated bearings. The pitman shaft 78 is fixedly provided at an intermediate portion thereof with a sector gear 79, which is in mesh with the rack 63 on the piston member 61. Although not shown, the pitman shaft 78 is projected rightward from the tubular portion 42 and fixedly carries a pitman arm on the projected portion. The pitman arm is coupled to each front wheel through a linkage and a knuckle arm.

The portion of the input shaft 55 positioned inside the support member 45 provides an inner valve member 80. Positioned between the inner valve member 80 and the support member 45 is an outer valve member 81 fixed to the rear end of the output shaft 48. These valve members constitute a known rotary hydraulic control valve 82. The support member 45 is formed with an oil inlet port 83 and an oil outlet port 84. These ports 83, 84 are in communication with an unillustrated hydraulic source and with the two oil chambers 67, 68 of the cylinder portion 41 via the control valve 82.

With the power steering device described, the rotation of the steering wheel is transmitted to the output shaft 48 via the input shaft 55 and the torsion bar 57, and the rotation of the output shaft 48 is transmitted to the piston member 61 upon speed reduction by the two ball thread means 71, 75, consequently moving the piston member 61 forward or rearward. This movement of the piston member 61 rotates the pitman shaft 78 by virtue of the meshing engagement of the rack 63 with the sector gear 79, consequently steering the wheels by way of linkage, etc. When rotated, the steering wheel also twists the torsion bar 57, producing a rotational difference between the input shaft 55 and the output shaft 48, i.e., between the inner valve member 80 and the outer valve member 81. As a result, pressure oil is supplied from the inlet port 83 to one of the oil chambers 67, 68 of the cylinder portion 41 by way of the hydraulic control valve 82 to urge the piston portion 64 in the direction in which the piston member 61 is moved by the rotation of the output shaft 48 and produce a hydraulic steering force. The flow of oil to and from valve 82 to chamber 67 is effected by a conduit A while the flow of il to and from chamber 68 and valve 82 is effected through the space between the inner and outer races of ball bearing assembly 52.

When the steering wheel is rotated leftward, the piston member 61 moves forward to steer the wheels leftward. At this time, the inner valve member 80 rotates leftward relative to the outer valve member 81, permitting the pressure oil to be supplied from the inlet port 83 to the rear oil chamber 68 of the cylinder portion 41 through the hydraulic control valve 82 to urge the piston portion 64 forward.

When the steering wheel is rotated rightward, the piston member 61 moves rearward to steer the wheels rightward. At this time, the inner valve member 80 rotates rightward relative to the outer valve member 81, allowing the pressure oil to be supplied from the inlet port 83 to the front oil chamber 67 of the cylinder portion 41 via the control valve 82 to urge the piston portion 64 rearward.

As in the foregoing case, the reduction ratio can be optionally determined also in this case by suitably determining the direction (hand) of threads of the two ball thread means 71, 75 and the lead of thread of one of these means relative to that of the other means.

For example, suppose the first ball thread means 71 is left-handed and the second ball thread means 75 is right-handed. When the steering wheel is rotated leftward to rotate the output shaft 48 leftward as it is seen from the rear, the intermediate rotary shaft 69 also rotates leftward, causing the first ball thread means 71 to move the shaft 69 forward relative to the output shaft 48 and causing the second ball thread means 75 to move the piston member 61 forward relative to the intermediate rotary shaft 69. As a result, the piston member 61 moves forward relative to the housing 40. The amount of this movement is equal to the amount of movement of the intermediate rotary shaft 69 relative to the output shaft 48 plus the amount of movement of the piston member 61 relative to the intermediate rotary shaft 69. Accordingly, the piston member 61 move forward by an amount in proportion to the sum of leads of threads of the two ball thread means 71, 75. When the steering wheel is rotated rightward to rotate the output shaft 48 rightward as it is seen from the rear, the piston member 61 moves rearward by an amount which is similarly in proportion to the sum of leads of threads of the two ball thread means 71, 75.

Further suppose the two ball thread means 71, 75 are left-handed. When the steering wheel is rotated leftward to rotate the output shaft 48 leftward as it is seen from the rear, the first ball thread means 71 acts to move the intermediate rotary shaft 69 forward relative to the output shaft 48, with the second ball thread means 75 acting to move the piston member 61 rearward relative to the intermediate rotary shaft 69. If the lead of thread of the first ball thread means 71 is then greater than that of the second ball thread means 75, the piston member 61 moves forward by an amount in proportion to the difference between the leads of threads of these ball thread means 71, 75. When the output shaft 48 as seen from the rear is rotated rightward by rotating the steering wheel rightward, the piston member 61 moves rearward similarly by an amount in proportion to the difference.

When the steering wheel is rotated leftward to rotate the output shaft 48 leftward as it is seen from the rear in the case where the two ball thread means 71, 75 are right-handed, the first ball thread means 71 acts to move the intermediate rotary shaft 69 rearward relative to the output shaft 48, with the second ball thread means 75 acting to move the piston member 61 forward relative to the intermediate shaft 69. If the lead of thread of the first ball thread means 71 is then smaller than that of the second ball thread means 75, the piston member 61 moves forward by an amount in proportion to the difference between the leads of threads of these means 71, 75. When the output shaft 48 as seen from the rear is rotated rightward by rotating the steering wheel rightward, the piston member 61 moves rearward similarly by an amount in proportion to the difference.

Although the foregoing embodiments are steering devices for front wheels, the present invention is applicable also to steering devices for rear wheels. The invention is applicable also to speed reduction devices other than steering devices.

When the foregoing embodiments are adapted to operate as speed reduction devices, the speed reduction mechanism can be simplified to diminish the overall transmission loss. Furthermore, the mechanism can be operated as a speed increasing mechanism.

The steering device and speed reduction device of the invention are not limited to the above embodiments in construction but can be modified suitably within the scope of the invention as defined in the appended claims.

What is claimed is:

1. A speed reduction device for steering devices, the speed reduction device comprising a tubular first rotary shaft supported by a housing and rotatable by an external force, a tubular second rotary shaft whereby the second rotary shaft is axially moveable and nonrotatable relative, to the first rotary shaft a movable member attached to the housing whereby the moveable member is axially moveable and nonrotatable relative to the housing, said moveable member further being fitted to an inner side of the second rotary shaft whereby the moveable member is axially movable and rotatable relative, to the second rotary shaft first thread coupling means connecting the second rotary shaft to the housing, and second thread coupling means connecting the movable member to the second rotary shaft, whereby the rotation of the first rotary shaft is transmitted to the movable member as an axial movement thereof upon speed reduction.

2. A speed reduction device as defined in claim 1 wherein the first rotary shaft is rotatable by an electric motor, and the movable member is a rack shaft.

3. A speed reduction device as defined in claim 2 wherein the electric motor has a rotor attached to the first rotary shaft and a stator attached to the housing.

4. A speed reduction device as defined in claim 2 wherein the electric motor is a brushless electric motor wherein said electric motor has a rotor, and wherein a sensor for detecting the rotated position of the motor rotor is attached to the motor directly or indirectly with a coupling mechanism interposed therebetween.

5. A speed reduction device comprising a tubular first rotary shaft supported by a housing and rotatable by an external force, a tubular second rotary shaft fitted to an inner side of the first rotary shaft whereby the second rotary shaft is axially moveable and nonrotatable relative to the first rotary shaft, a movable member attached to the housing whereby the moveable member is axially moveable and nonrotatable relative to the housing, said moveable member further being fitted to an inner side of the second rotary shaft whereby the moveable member is axially moveable and rotatable relative to the second rotary shaft, first thread coupling means connecting the second rotary shaft to the housing, and second thread coupling means connecting the movable member to the second rotary shaft.

6. A steering device comprising a tubular first rotary shaft supported by a housing and rotatable by an external force, a tubular second rotary shaft fitted to an inner side of the first rotary shaft whereby the second rotary shaft is axially moveable and nonrotatable relative to the first rotary shaft, a movable member attached to the housing whereby the moveable member is axially moveable and nonrotatable relative to the housing, said moveable member further being fitted to an inner side of the second rotary shaft whereby the moveable member is axially moveable and rotatable relative to the second rotary shaft, first thread coupling means connecting the second rotary shaft to the housing, and second thread coupling means connecting the movable member to the second rotary shaft.

* * * * *